US012778339B2

(12) United States Patent
Carbonini

(10) Patent No.: US 12,778,339 B2
(45) Date of Patent: Nov. 3, 2026

(54) SYSTEM FOR CLEANING MILK DUCTS FOR A MACHINE FOR PREPARING BEVERAGES

(71) Applicant: LUIGI LAVAZZA S.P.A., Turin (IT)

(72) Inventor: Carlo Carbonini, Turin (IT)

(73) Assignee: LUIGI LAVAZZA S.P.A., Turin (IT)

( * ) Notice: Subject to any disclaimer, the term of this patent is extended or adjusted under 35 U.S.C. 154(b) by 152 days.

(21) Appl. No.: 18/285,739

(22) PCT Filed: Apr. 6, 2022

(86) PCT No.: PCT/IB2022/053195
§ 371 (c)(1),
(2) Date: Oct. 5, 2023

(87) PCT Pub. No.: WO2022/214983
PCT Pub. Date: Oct. 13, 2022

(65) Prior Publication Data

US 2024/0180358 A1 Jun. 6, 2024

(30) Foreign Application Priority Data

Apr. 8, 2021 (IT) ........................ 102021000008768

(51) Int. Cl.
*A47J 31/60* (2006.01)
*A47J 31/40* (2006.01)
*A47J 31/46* (2006.01)

(52) U.S. Cl.
CPC ............ *A47J 31/60* (2013.01); *A47J 31/402* (2013.01); *A47J 31/469* (2018.08)

(58) Field of Classification Search
CPC .......... A47J 31/60; B08B 9/0325; B08B 3/08; B08B 9/0321; B08B 9/0328; B08B 3/02;
(Continued)

(56) References Cited

U.S. PATENT DOCUMENTS

2007/0251459 A1* 11/2007 Fukushima ......... A47J 31/4485 119/14.18
2011/0049187 A1* 3/2011 Boekhoorn ............. A47J 31/60 222/145.6

(Continued)

FOREIGN PATENT DOCUMENTS

DE 10 2013 107 077 A1 1/2015
DE 102016100715 A1 * 7/2017 ........... A47J 31/469

(Continued)

OTHER PUBLICATIONS

Machine translation of DE102017106286A1 (Year: 2018).*

(Continued)

*Primary Examiner* — Douglas Lee
(74) *Attorney, Agent, or Firm* — Sughrue Mion, PLLC

(57) ABSTRACT

A cleaning system for a machine for preparing beverages has a washing water supply piping and a washing chamber suppliable with washing water provided by the washing water supply piping. A movable part of a flexible hose extracted from a milk reservoir may be placed into the washing chamber. Through the flexible hose, the washing water contained in the washing chamber may be conveyed to a frothing head of the machine. The washing chamber is formed in a tray couplable in a releasable manner to the machine under the frothing head. A collection chamber, also formed in the tray, is separate from the washing chamber and configured to be arranged under the distribution duct of the frothing head.

9 Claims, 5 Drawing Sheets

(58) Field of Classification Search
CPC ..... B08B 9/032; B08B 2209/032; B08B 9/08; B08B 3/04; B08B 3/12; B08B 9/023; B08B 9/027; B08B 9/0327; B08B 3/102; B08B 9/093; B08B 9/00; B08B 7/00; B08B 2209/08; B08B 9/0323; B08B 1/00; B08B 9/0813; B08B 2203/027; B08B 3/042; B08B 3/06; B08B 13/00; B08B 9/02; B08B 2203/007; B08B 9/0326; B08B 1/10; B08B 9/0436; B08B 1/12; B08B 3/10; B08B 1/30; B08B 3/048; B08B 2230/01; B08B 3/106; B08B 9/087; B08B 9/0821; B08B 5/04; B08B 5/023; B08B 7/028; B08B 9/0804; B08B 9/0808; B08B 9/0817; B08B 3/028; B08B 9/043; B08B 9/0433; B08B 2209/024; B08B 5/00; B08B 2209/022; B08B 3/104; B08B 1/165; B08B 1/32; B08B 1/36; B08B 3/024; B08B 3/044; B08B 3/14; B08B 9/0936; B08B 9/283; B08B 7/0057; B08B 7/0071; B08B 9/22; B08B 9/423; B08B 2209/02; B08B 7/0035; B08B 9/021; B08B 9/0826; B08B 9/38; B08B 1/14; B08B 1/16; B08B 17/02; B08B 2203/0223; B08B 7/04; B08B 17/025; B08B 3/022; B08B 5/02
See application file for complete search history.

(56) References Cited

U.S. PATENT DOCUMENTS

| | | | | |
|---|---|---|---|---|
| 2011/0192287 | A1* | 8/2011 | Riessbeck | A47J 31/60 134/22.12 |
| 2018/0192818 | A1* | 7/2018 | Epping | A47J 31/60 |
| 2019/0069713 | A1* | 3/2019 | Dees | A47J 31/52 |

FOREIGN PATENT DOCUMENTS

| | | | | |
|---|---|---|---|---|
| DE | 102016100740 | A1 * | 7/2017 | A47J 31/60 |
| DE | 102017106286 | A1 * | 9/2018 | A47J 31/5255 |
| EP | 2 353 472 | A1 | 8/2011 | |
| EP | 3064104 | A1 * | 9/2016 | A47J 31/60 |
| EP | 3305144 | A1 * | 4/2018 | A47J 31/4485 |
| EP | 3 345 518 | A1 | 7/2018 | |
| WO | WO-2005102126 | A2 * | 11/2005 | A47J 31/4485 |
| WO | 2017/155400 | A1 | 9/2017 | |

OTHER PUBLICATIONS

Machine translation of DE102016100715A1 (Year: 2017).*
Machine translation of DE102016100740A1 (Year: 2017).*
International Search Report for PCT/IB2022/053195 dated Jun. 29, 2022 [PCT/ISA/210].

* cited by examiner

SYSTEM FOR CLEANING MILK DUCTS FOR A MACHINE FOR PREPARING BEVERAGES

CROSS-REFERENCE TO RELATED APPLICATIONS

This application is a National Phase Application of PCT International Application No. PCT/IB2022/053195, having an International Filing Date of Apr. 6, 2022, claiming priority to Italian Patent Application No. 102021000008768, filed Apr. 8, 2021 each of which is hereby incorporated by reference in its entirety.

FIELD OF THE INVENTION

This invention relates in general to devices for whipping milk, which devices may be used for preparing a beverage such as a cappuccino, whipped milk, and the like. As is known, these devices comprise a frothing head which is supplied via a piping connected to a milk reservoir. This piping generally comprises a flexible hose which is immersed into the interior of the milk reservoir. In some known solutions, the milk reservoir is simply a separate bottle or container which is used when preparing the beverage. Once the beverage has been distributed, the bottle or container is generally returned to a refrigerated environment to be stored.

BACKGROUND OF THE INVENTION

Different cleaning systems are known in which the parts and ducts which have come into contact with the milk are periodically cleaned. In some known systems, makeshift trays are used which are filled with water and optionally detergent and into which the flexible hose that has been extracted from the milk reservoir is immersed. In other systems, parts that have come into contact with the milk are removed, and these parts are washed or disposed of.

SUMMARY OF THE INVENTION

The object of this invention is to provide a cleaning system in which it is possible to minimize the manual operations required when cleaning the machine.

This and other objects are achieved, according to the invention, by a cleaning system for a machine for preparing beverages, wherein said machine includes

- a water supply configured to supply liquid water or steam within the machine,
- a frothing head for whipping milk, said frothing head comprising a milk inlet and a distribution duct for distributing a beverage, which distribution duct is arranged downstream of the milk inlet, and
- a milk supply piping having an inlet end which may be connected to a milk reservoir and an outlet end which is connected to the milk inlet of the frothing head, said milk supply piping comprising, at the inlet end, a flexible hose having a fixed end and a movable part configured to be immersed into the milk reservoir, wherein said cleaning system includes

- a washing water supply piping having an inlet end connected to the water supply and an outlet end,
- a washing chamber which may be supplied with washing water provided by the washing water supply piping, it being possible to place the movable part of the flexible hose that has been extracted from the milk reservoir in said washing chamber,
- wherein, through the flexible hose, the washing water contained in the washing chamber may be conveyed to the milk inlet and to the distribution duct of the frothing head, and
- wherein the washing chamber is formed in a tray which may be coupled in a releasable manner to the body of the machine under the frothing head, a collection chamber also being formed in said tray, which collection chamber is separate from the washing chamber and configured to be arranged under the distribution duct of the frothing head.

By using a system according to the invention, it is possible to minimize the manual operations required to clean the milk ducts. In particular, on account of the fact that the tray has a separate collection chamber and washing chamber, the washing cycle may be carried out in a simple manner, since it is possible to manage the washing of the ducts and the discharge of the washing residues using just one means.

BRIEF DESCRIPTION OF THE FIGURES

Further features and advantages of the invention will become clear from the detailed description that follows, given purely by way of non-limiting example and with reference to the accompanying drawings, in which.

DETAILED DESCRIPTION

Figure 1:
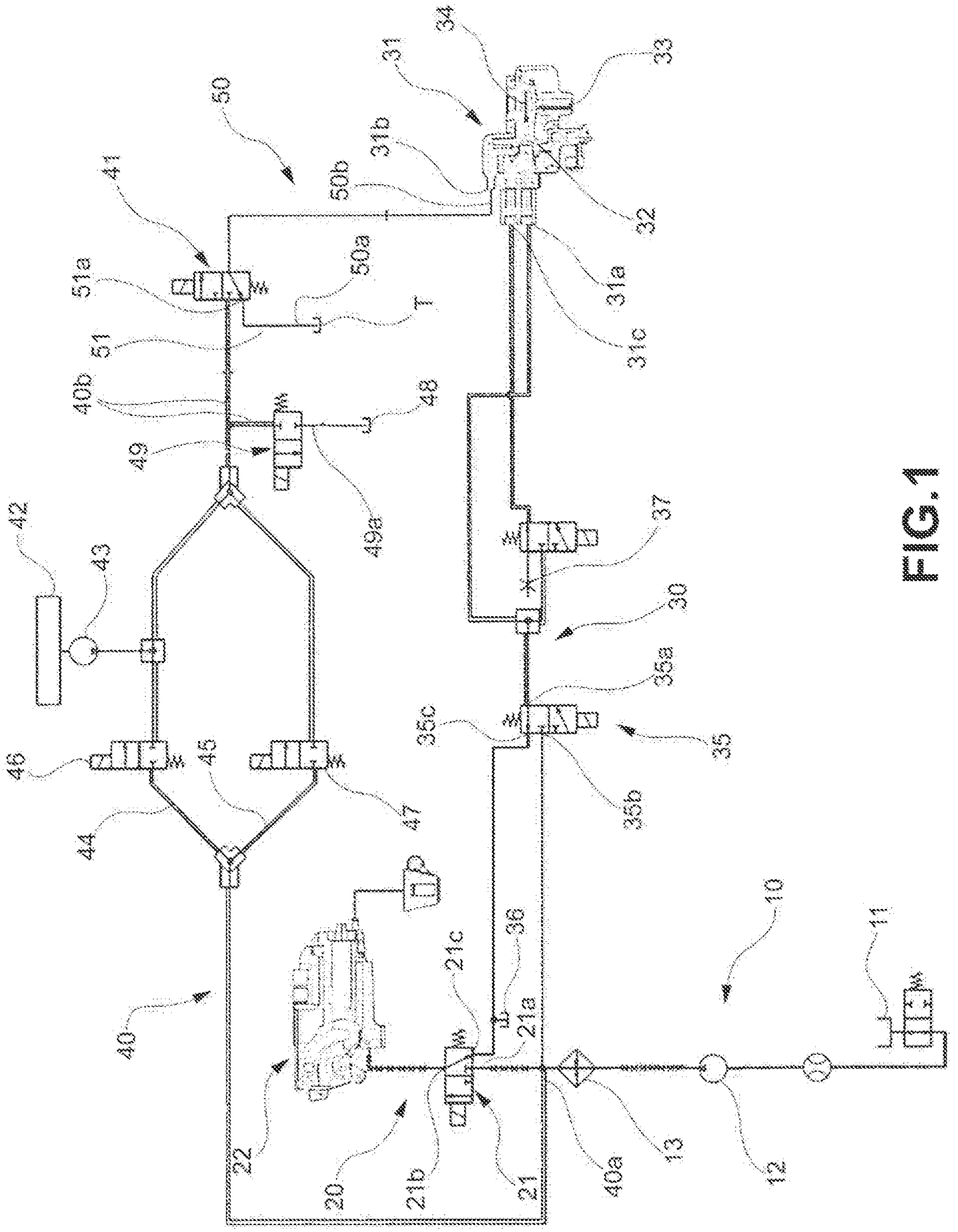
FIG. 1 is an electro/fluidic diagram of a machine for preparing beverages, comprising a cleaning system according to a first embodiment of the invention.

FIG. 1 shows, as a whole, a machine for preparing beverages, in particular coffee, cappuccino and the like. In general, this invention covers both domestic machines and machines used in business or public environments, as well as vending machines.

This machine comprises a water supply 10 configured to supply liquid water or steam within the machine. In the example shown, inside the machine, the water supply comprises a water supply system 10 of the kind known per se. The water supply system 10 typically comprises a reservoir 11, an electric pump 12 which draws the water from the reservoir 11, and a heating device 13 supplied with the water provided by the pump 12. The heating device 13 is a so-called instantaneous heating device, otherwise known as a flow heater or transit heater, and is used to generate the steam or hot water flow necessary for the system to operate. In general, other means for generating steam that are of a type known to a person skilled in the art may be provided. According to an embodiment which is not shown, the machine may not have a proper water supply system. In this case, the water supply may comprise a fitting or connector for directly connecting to the mains water.

A brewing line 20, a frothing line 30 and a washing water supply line or piping 40 branch off downstream of the heating device 13. The brewing line 20 comprises a brewing valve 21 having an inlet 21*a* connected to the heating device 13 and an outlet 21*b* connected to a brewing unit 22 of a kind known per se, in such a way that a flow of steam is supplied to this unit 22 for the preparation of a brewed beverage, for example a coffee-based beverage. The brewing valve 21 may be switched between a first position in which the brewing unit 22 is in fluid communication with the heating device 13, and a second position in which the brewing unit 22 is isolated from the heating device 13. The brewing valve 21 may also comprise an outlet 21*c* which is connected to a water discharge receptacle and which, in the second position, is connected to the outlet 21*b* to allow water to be discharged from the brewing unit 22.

The frothing line 30 comprises a frothing head 31 of a kind known per se. The frothing head 31 comprises a steam-driven jet pump 32 and a distribution duct 33 for distributing a beverage, which distribution duct is arranged downstream of the jet pump 32. The frothing head 31 comprises a steam inlet 31*a* through which the steam produced by the heating device 13 may be injected into the jet pump 32 in order to generate a steam jet. A frothing chamber 34 of the kind known per se, into which the steam/milk/air mixture is conveyed in order to create an emulsion, and a subsequent dispensing duct may be arranged downstream of the jet pump 32 and upstream of the distribution duct 33.

The frothing line 30 also comprises a steam valve 35 comprising an outlet 35*a* connected to the steam inlet 31*a* of the frothing head 31, and an inlet 35*b* connected to the outlet of the heating device 13. The steam valve 35 may be switched between a first position in which the frothing head 31 is in fluid communication with the heating device 13, and a second position in which the frothing head 31 is isolated from the heating device 13. The steam valve 35 may also comprise an outlet 35*c* which is connected to a water discharge receptacle 36 and which, in the second position, is connected to the outlet 35*a* to allow water to be discharged from the frothing line 30.

Moreover, the frothing head 31 comprises a milk inlet 31*b* and an air inlet 31*c* through which the respective fluids may be drawn by the steam jet within the jet pump 32 in order to be mixed with the steam jet. The milk inlet 31*b* is connected to a milk reservoir T, in the manner described in the following. This milk reservoir T is a bottle or container which is used when preparing the beverage, and then returned to a refrigerated environment to be stored. For the purposes of this invention, the term "milk" comprises milk and derivatives of animal and plant origin (soya, rice, oat, almond, hazelnut, nuts, etc.) and preparations based on milk together with other ingredients (cocoa/chocolate, fruit).

The frothing line 30 may also comprise further valves and fluidic components arranged between the steam valve 35 and the frothing head 31. These further valves and fluidic components do not form the subject of this invention and will therefore not be described further. It should be noted here that the frothing line 30 comprises an air supply 37 which may be put in fluid communication with the air inlet 31*c* of the frothing head 31 in order to suck air into the jet pump 32.

The milk inlet 31*b* of the frothing head 31 is connected to the milk reservoir T via a milk supply line or piping 50. The milk supply piping 50 has an inlet end 50*a* which may be connected to the milk reservoir T and an outlet end 50*b* which is connected to the milk inlet 31*b* of the frothing head 31. At the inlet end 50*a*, the milk supply piping 50 typically comprises a flexible hose 51 which has a fixed end 51*a*, in particular an end fixed to the body of the machine for preparing beverages, and a movable part configured to be immersed into the milk reservoir T.

The machine for preparing beverages also comprises a cleaning system which may be actuated to clean the milk supply piping 50 and the frothing head 31.

This cleaning system includes the washing water supply line or piping 40. The washing water supply piping 40 has an inlet end 40*a* connected to the water supply system 10, more specifically to the outlet of the heating device 13, and an outlet end 40*b*.

The cleaning system also comprises a detergent supply 42 connected to the washing water supply piping 40. In the example shown, a pump 43, for example a peristaltic pump, is associated with the detergent supply 42, which pump is configured to draw the detergent from the detergent supply 42 and introduce it into the washing water supply piping 40. This configuration is not essential to the purposes of the invention, and other means for dosing the detergent, for example a dosing valve system, may be provided instead of the pump. According to further embodiments, the detergent may be provided without using a pump or valve means, for example by falling or gravity. According to other embodiments, the detergent may be provided in a solid form (tablets) by means of a specific dispenser.

In the example shown, the washing water supply piping 40 comprises a cleaning branch 44 and a rinse branch 45 arranged in parallel. The cleaning branch 44 is connected to the detergent supply 42. A shut-off valve is associated with each of these branches, which valves are denoted by 46 and 47, respectively, in order to selectively fluidically connect or disconnect the relevant branch to/from the water supply system 10. This dual-line configuration has the advantage of providing additional guarantees in terms of reducing the risk of milk contamination as a result of the washing processes described in the following. Nevertheless, it is possible to design a configuration in which the washing water supply piping 40 comprises a single branch configured as the cleaning branch 44 or, in the event that the machine does not have a detergent supply, as the rinse branch 45.

The cleaning system also comprises a washing chamber 48 which may be supplied with washing water provided by the washing water supply piping 40. As will be described in the following, the movable part of the flexible hose 51 that has been extracted from the milk reservoir T may be placed in the washing chamber 48.

With reference again to FIG. 2, the washing chamber 48 is formed in a tray 60" which may be coupled in a releasable manner to the body of the machine M, under the frothing head 31. A collection chamber 72" is also formed in this tray 60", which collection chamber is separate from the washing chamber 48 and configured to be arranged under the distribution duct 33 of the frothing head 31.

The cleaning system also comprises washing valve means arranged at the outlet end 40*b* of the washing water supply piping 40. These washing valve means are also arranged between the flexible hose 51 and the frothing head 31, and may be switched between a first position in which the flexible hose 51 is isolated from the milk inlet 31*b* of the frothing head 31, and a second position in which the flexible hose 51 is in fluid communication with the milk inlet 31*b* of the frothing head 31. In the first position of the washing valve means, the washing water supply piping may also be fluidically connected to the washing chamber 48 by means of the washing valve means, for washing the movable part of the flexible hose 51 placed in the washing chamber 48. Through the flexible hose 51, the washing water contained in the washing chamber 48 may be conveyed to the milk inlet 31*b* and thus, by means of the jet pump 32, to the distribution duct 33 of the frothing head 31.

Figure 2:
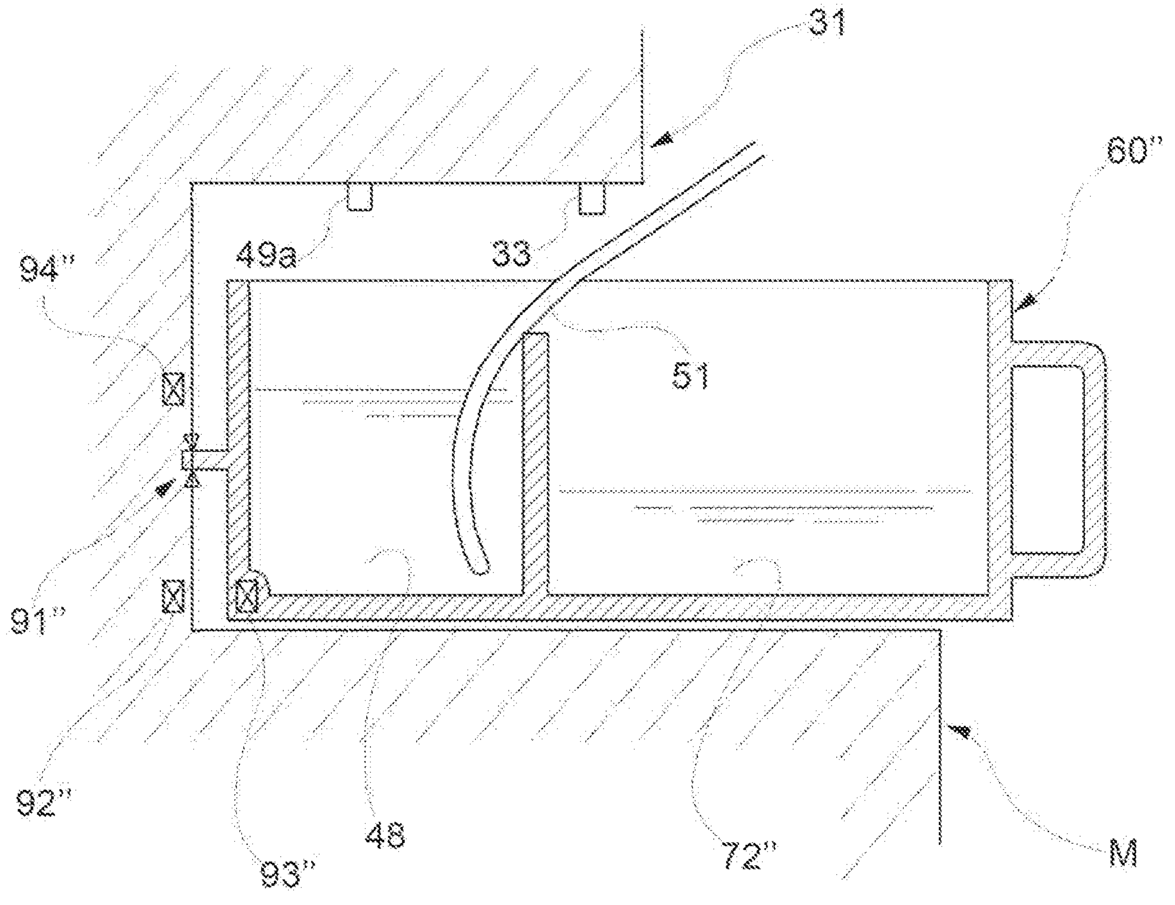
FIG. 2 is a sectional view showing the front of the machine in FIG. 1, FIGS. 3 and 4 are electro/fluidic diagrams of a machine for preparing beverages, comprising a cleaning system according to a second and a third embodiment of the invention.

In the example shown, the aforementioned valve means comprise a first washing valve 41 which connects the outlet end 40*b* of the washing water supply piping 40 and the flexible hose 51 to the milk inlet 31*b* of the frothing head 31, and a second washing valve 49 which connects the outlet end 40*b* of the washing water piping 40 to the washing chamber 48. The first washing valve 41 may be switched between a first position in which the flexible hose 51 is isolated from the milk inlet 31*b* of the frothing head 31 and the outlet end 40*b* of the washing water piping 40 is in fluid communication with the milk inlet 31*b* of the frothing head 31, and a second position in which the flexible hose 51 is in fluid communication with the milk inlet 31*b* of the frothing head 31 and the outlet end 40*b* of the washing water piping 40 is isolated from the milk inlet 31*b* of the frothing head 31. The second washing valve 49 may be switched between a first position in which the washing chamber 48 is in fluid communication with the outlet end 40*b* of the washing water piping 40, and a second position in which the washing chamber 48 is isolated from the outlet end 40*b* of the washing water piping 40. In FIGS. 1 and 2, reference sign 49*a* indicates an outlet of the second washing valve 49, which outlet is positioned on the front of the machine M in a position such that, when the tray 60" is fixed to the machine M, the outlet 49*a* is above the washing chamber 48.

In the example shown, the fixed end 51*a* of the flexible hose 51 is connected to the first washing valve 41. When the machine for preparing beverages is in the working condition, the movable part of the flexible hose 51 is immersed into the milk reservoir T while the first washing valve 41 is in its second position, and therefore allows the frothing head 31 to suck the milk from the reservoir T, through the flexible hose 51 and the milk supply piping 50, as a result of the action of the jet pump 32.

The device described above also comprises an electronic control unit operatively connected to the various devices of the machine for preparing beverages. The electronic control unit is configured to control and coordinate the aforesaid components in a predetermined manner according to instruction signals provided to the control unit.

A semi-automatic cleaning process will now be described which allows all of the ducts and components that have come into contact with the milk to be cleaned.

Firstly, a user fixes the tray 60" to the machine M and positions the movable part of the flexible hose 51 in the washing chamber 48.

By acting on a user interface of the machine M, the user starts the cleaning process. The electronic control unit of the machine then actuates the distribution of water comprising detergent to the washing chamber 48; the water is delivered by the pump 12 of the water supply system 10 and mixes with the detergent in the washing water supply piping 40. The washing water is then introduced into the washing chamber 48 through the second washing valve 49, which is in a position that puts the outlet 49*a* in fluid communication with the washing water supply piping 40. The fluid communication with the flexible hose 51 and with the frothing head 31 is blocked.

The electronic control unit then switches the valve means 41, 49 so as to establish the fluid communication between the flexible hose 51 and the frothing head 31, and block the fluid communication between the washing water supply piping 40 and the washing chamber 48. The electronic control unit also activates the frothing line so that steam is delivered to the frothing head 31 through the steam inlet 31*a* thereof. The jet pump 32 of the frothing head 31 then sucks up the washing water comprising detergent present in the washing chamber 48, through the flexible hose 51 and the rest of the milk supply piping 50. The steam with the washing water and the detergent are then discharged into the collection chamber 72" of the tray 60", through the distribution duct 33. The washing cycle described above may be carried out more than once in order to increase the effectiveness thereof.

In a possible duct rinsing phase, the process is analogous to that described above, except for the fact that the washing water supply piping 40 is now configured to supply water without detergent. In the event that the washing water supply piping 40 has a cleaning branch 44 and a rinse branch 45, as shown in FIG. 1, this involves enabling the rinse branch 45 and disabling the cleaning branch 44 via the respective valves 46 and 47. If the washing water supply piping has just one branch, the electronic control unit may simply block the detergent supply to the washing water supply piping 40. The rinsing cycle described above may be carried out more than once in order to increase the effectiveness thereof.

An alternative cleaning process may be provided which allows all of the ducts that have come into contact with the milk to be cleaned, with the exception of the flexible hose 51.

By acting on the user interface of the machine M, the user starts the cleaning process. The electronic control unit of the machine then actuates the distribution of water comprising detergent to the valve means 41, 49: the water is delivered by the pump 12 of the water supply system 10 and mixes with the detergent in the washing water supply piping 40. The valve means 41, 49 are in a position that puts the washing water supply piping 40 in fluid communication with the external part of the milk supply piping 50 and the frothing head 31. The fluid communication with the flexible hose 51 and with the washing chamber 48 is blocked. The washing water comprising detergent then reaches the frothing head 31 through the milk supply piping 50. The washing water and the detergent are then discharged into the collection chamber 72" through the distribution duct 33.

A possible duct rinsing phase is analogous to the washing phase described above, except for the fact that the washing water supply piping 40 is now configured to supply water without detergent.

In terms of monitoring the rinse phase, a detergent presence sensor may be provided to detect the residual presence of detergent in the rinse water. This sensor may be a turbidity sensor, for example a conductive sensor, and may be associated with the tray 60" or positioned at the end 40*b* of the washing water supply piping 40 or in the milk supply piping 50. On the basis of a signal provided by the detergent presence sensor, the control unit of the machine may be configured to control the number of rinse cycles required to completely remove the detergent from the ducts through which the milk is intended to pass. According to a further embodiment, a detergent presence sensor may be integrated on the pump 43 for the detergent.

In order to fix the tray 60" to the body of the machine M, a mechanical affixing system, for example a clip-on system, may be provided, which system is denoted by 91" in FIG. 2. A presence sensor 92" may also be provided, which presence sensor is configured to detect the presence or absence of the tray 60" and provide a corresponding signal. In the example shown, the presence sensor 92" is designed as a magnetic sensor, in particular a reed sensor, which is configured to detect a magnet 93" mounted on the tray 60". A level sensor 94", for example an optical or capacitive sensor, may also be provided, which level sensor is configured to detect the level of liquid within the washing chamber 48 and provide a corresponding signal.

Figure 3:
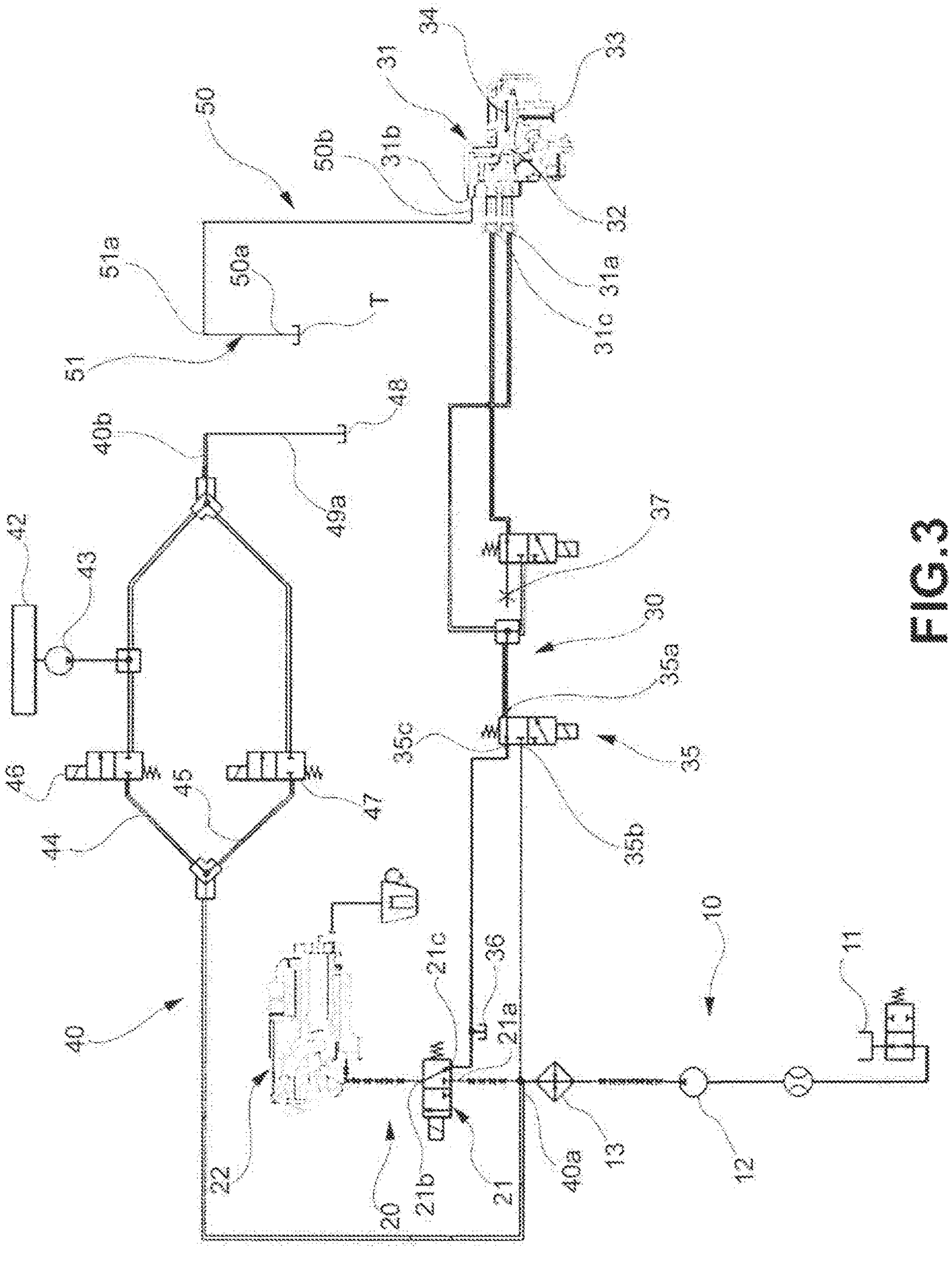

FIG. 3 shows a machine for preparing beverages, comprising a second embodiment of the cleaning system. Elements corresponding to those of the preceding embodiment have been assigned the same reference signs: these elements will not be described again.

The embodiment in FIG. 3 differs from the preceding embodiment in that valve means are not provided at the outlet end 40*b* of the washing water supply line or piping 40. Moreover, there is no direct communication between the washing water supply line 40 and the milk supply line 50, but only indirect communication through the washing chamber 48 when the flexible hose 51 is placed inside the washing chamber 48. In the embodiment in FIG. 3, the removable tray 60" described above may be used; it is understood that what is shown and described in relation to FIG. 2 also applies to the embodiment in FIG. 3. In this case, the outlet 49*a* is directly connected to the outlet end 40*b* of the washing water supply system 40.

In the embodiment in FIG. 3, only the cleaning cycle described above may be carried out, in which the flexible hose 51 inserted in the washing chamber 48 is used.

Figure 4:
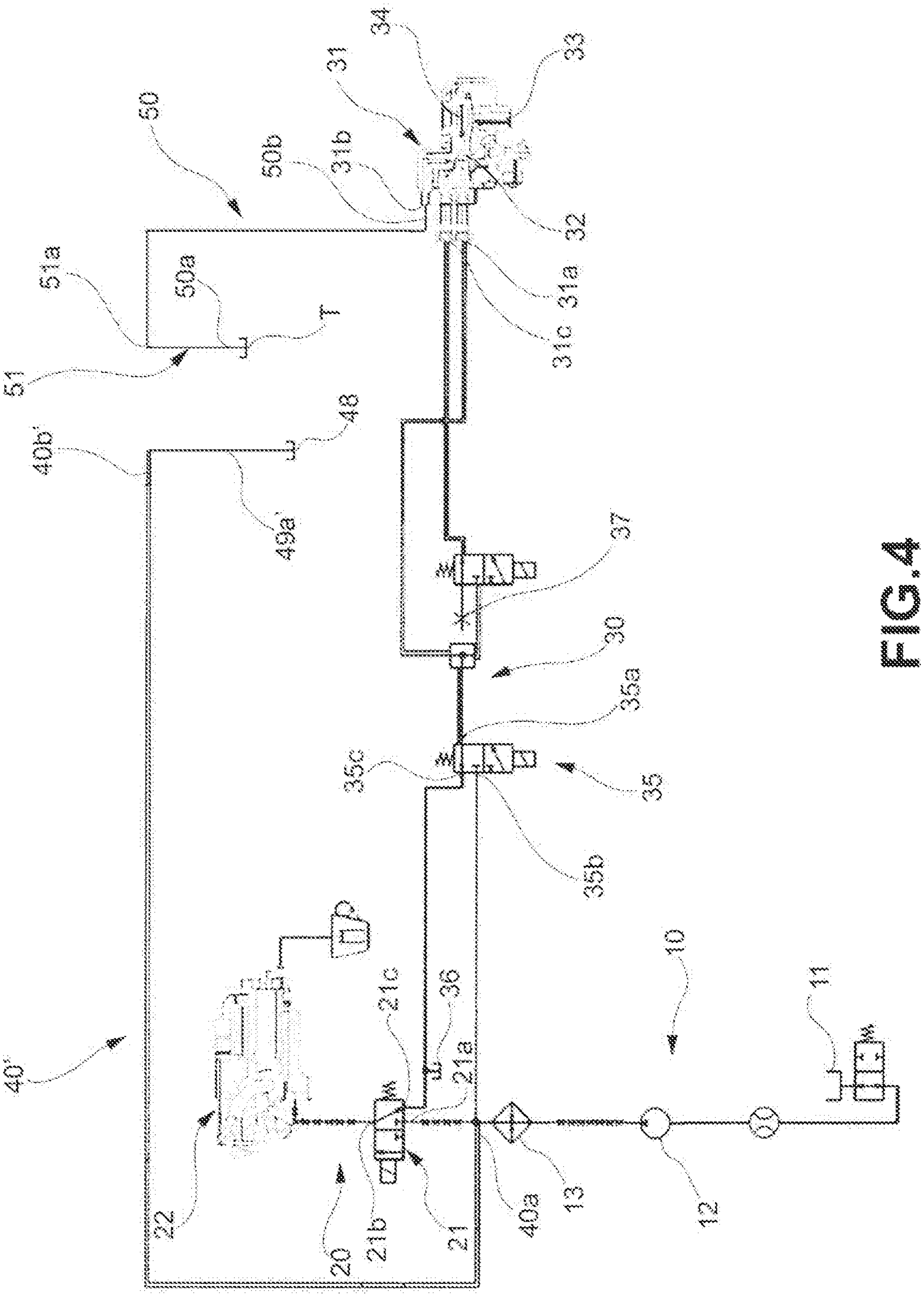

FIG. 4 shows a machine for preparing beverages, comprising a third embodiment of the cleaning system. Elements corresponding to those of the preceding embodiment have been assigned the same reference signs: these elements will not be described again.

Figure 5:
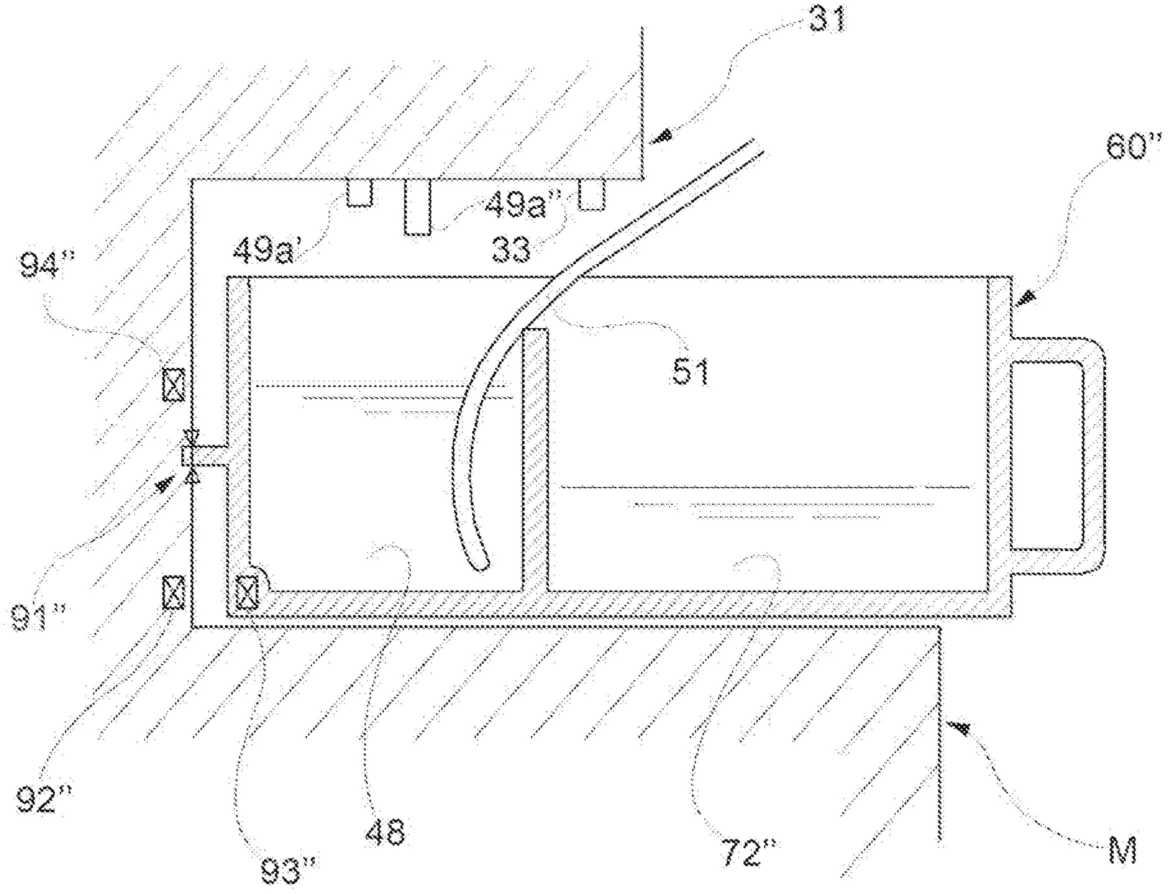
FIG. 5 is a sectional view showing the front of the machine in FIG. 4.

The embodiment in FIG. 4 is analogous to that in FIG. 3, but differs therefrom in that a specific washing water supply line is not provided, and instead a water supply line 40' is provided, in particular for the distribution of hot water which is normally provided for preparing infusions such as tea and herbal tea. For the purposes of this invention, the water supply line 40' therefore performs the function of distributing the washing water, and will therefore be described as such for ease. The washing water supply line 40' has an inlet end 40*a*' connected to the water supply system 10, more specifically to the outlet of the heating device 13, and an outlet end 40*b*'. The washing water supply line 40' does not have an integrated detergent supply. Therefore, if provided, the detergent is introduced directly into the washing chamber 48, which also acts as a mixing chamber. The detergent may be provided using means that are entirely separate from the machine M. Alternatively, a detergent supply system that is separate from the washing water supply line 40' and designed to introduce the detergent into the washing chamber 48 may be provided in the machine itself. This latter configuration is in fact shown in FIG. 5, where 49*a*" denotes an outlet of the detergent supply system, which outlet is positioned on the front of the machine M in a position such that, when the tray 60" is fixed to the machine M, the outlet 49*a*" is above the washing chamber 48. The outlet 49*a*' may also be seen in FIG. 5, which outlet is directly connected to the outlet end 40*b*' of the washing water supply system 40', analogously to the embodiment in FIG. 3. According to a further embodiment, the detergent may be introduced directly into the washing chamber 48 manually by the user, in liquid or solid (tablet) form.

Naturally, without prejudice to the principle of the invention, the embodiments and the details of construction may vary widely with respect to that which has been described and illustrated purely by way of non-limiting example, without thereby departing from the scope of protection of the invention as defined in the appended claims.

The invention claimed is:

1. A machine for preparing beverages, wherein said machine comprises a water supply configured to supply liquid water or steam within the machine, a frothing head for heating and whipping milk, said frothing head comprising a milk inlet and a distribution duct for distributing a hot beverage, the distribution duct being arranged downstream of the milk inlet, a milk supply piping having an inlet end connectable to a milk reservoir and an outlet end connected to the milk inlet of the frothing head, said milk supply piping comprising, at the inlet end, a flexible hose having a fixed end and a movable part, and a cleaning system comprising:

a washing water supply piping comprising:

an inlet end connected to the water supply, an outlet, and a cleaning branch and a rinse branch arranged in parallel between the inlet end and the outlet and being conjoined at the inlet end and the outlet, a detergent supply being connected only with the cleaning branch among the cleaning branch and the rinse branch, thereby resulting in the cleaning branch including cleaning water and the rinse branch including rinse water, a washing chamber suppliable with washing water provided by the outlet of the washing water supply piping, the washing water including one of the cleaning water or the rinse water at any given time, wherein the movable part of the flexible hose is movable between the washing chamber and the milk reservoir, wherein, in a working condition of the cleaning system, the flexible hose is placed in the milk reservoir and configured to be immersed in milk in the milk reservoir, wherein, in an operating condition of the cleaning system, the movable part of the flexible hose is placed in the washing chamber and immersed in the washing water contained in the washing chamber, wherein the washing water supply piping further comprises shut-off valves configured to selectively put one of the cleaning branch or the rinse branch in fluid communication with the water supply at the inlet and with the washing chamber at the outlet, wherein, in the operating condition of the cleaning system, the shut-off valves sequentially put the cleaning branch in fluid communication with the washing chamber at the outlet, and then put the rinse branch in fluid communication with the washing chamber at the outlet, wherein, through the flexible hose, the washing water contained in the washing chamber is conveyable to the milk inlet and to the distribution duct of the frothing head, and wherein the washing chamber is formed in a tray, wherein in said operating condition of the cleaning system the tray is coupled in a releasable manner to the machine under the frothing head, a collection chamber also being formed in said tray, the collection chamber being separate from the washing chamber and arranged under the distribution duct of the frothing head in said operating condition of the cleaning system.

2. The machine of claim 1, wherein the washing chamber is configured to be arranged under the outlet.

3. The machine of claim 1, further comprising a mechanical affixing system for securing the tray to the machine under the frothing head.

4. The machine of claim 1, further comprising a presence sensor configured to provide a signal indicative of presence or absence of the tray.

5. The machine of claim 1, further comprising a level sensor configured to provide a signal indicative of a level of liquid within the washing chamber.

6. The machine of claim 1, wherein the frothing head further comprises a steam-driven jet pump, said steam-driven jet pump being connected upstream to the milk inlet and downstream to the distribution duct.

7. The machine of claim 1, further comprising washing valve means arranged at the outlet end of the washing water supply piping, said washing valve means also being arranged between the flexible hose and the frothing head, and being switchable between a first position in which the flexible hose is isolated from the milk inlet of the frothing head, and a second position in which the flexible hose is in fluid communication with the milk inlet of the frothing head, wherein, in the first position, the washing water supply piping is further fluidically connectable to the washing chamber via said washing valve means for washing the movable part of the flexible hose placed in the washing chamber.

8. The machine of claim 7, wherein, with the washing valve means in the first position, the washing water is conveyable into the washing chamber via the washing water supply piping and, with the washing valve means in the second position, the washing water contained in the washing chamber is conveyable to the milk inlet and to the distribution duct of the frothing head.

9. The machine of claim 1, further comprising a detergent presence sensor configured to detect a presence of detergent in the washing water and provide an indicative signal, a control unit being configured to control a rinse operation of the machine on the basis of said indicative signal.

* * * * *